W. H. DAMON.
SUN AND RAIN SHIELD FOR AUTOMOBILES.
APPLICATION FILED DEC. 20, 1918.
1,348,135.                                Patented July 27, 1920.
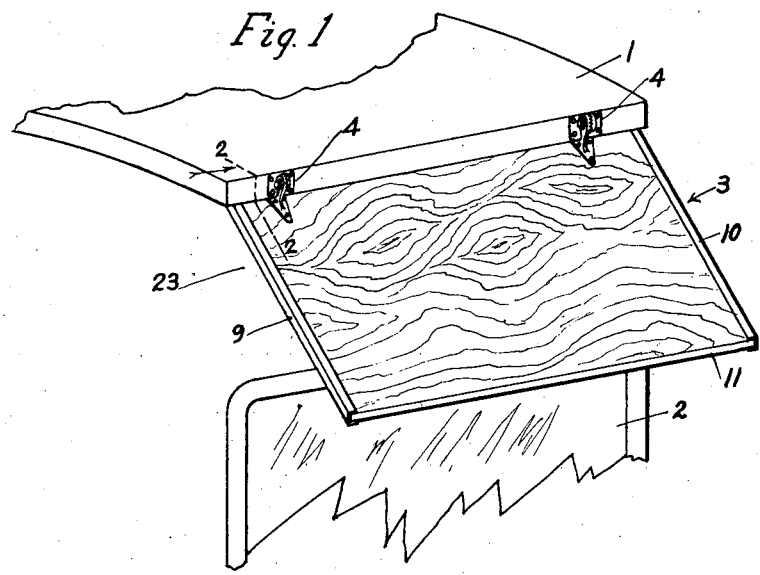
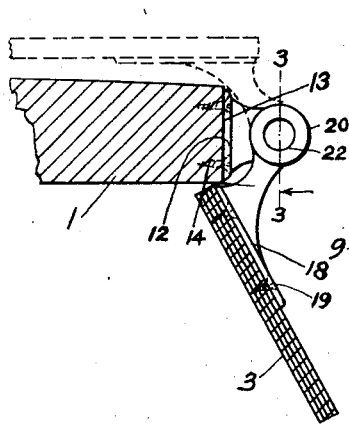
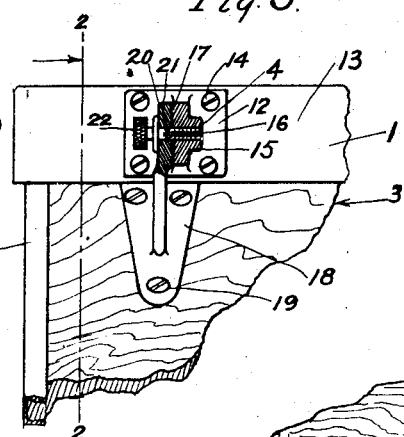
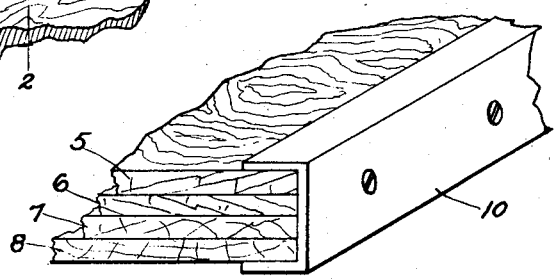
INVENTOR.
William H. Damon.
BY
Hazard & Miller
ATTORNEY.

UNITED STATES PATENT OFFICE.

WILLIAM H. DAMON, OF LOS ANGELES, CALIFORNIA.

SUN AND RAIN SHIELD FOR AUTOMOBILES.

1,348,135. Specification of Letters Patent. Patented July 27, 1920.

Application filed December 20, 1918. Serial No. 267,706.

*To all whom it may concern:*

Be it known that I, WILLIAM H. DAMON, a citizen of the United States, residing at 407 W. 23rd street, Los Angeles, in the county of Los Angeles and State of California, have invented new and useful Improvements in Sun and Rain Shields for Automobiles, of which the following is a specification.

An object of this invention is to make an adjustable sun and rain shield for automobiles, and the invention consists of the novel features herein shown, described and claimed.

Figure 1 is a perspective showing an adjustable sun and rain shield embodying the principles of my invention in position for use and attached to the front edge of an automobile top, parts of the automobile being broken away.

Fig. 2 is a sectional detail on the lines 2—2 of Figs. 1 and 3.

Fig. 3 is a fragmentary front elevation of the automobile top and shield the hinge being shown in section, the view being taken on the line 3—3 of Fig. 2 and looking in the direction indicated by the arrow.

Fig. 4 is a fragmentary perspective showing the material and construction of the shield.

The automobile top 1 and the regular wind shield 2 may be any of the usual constructions. The adjustable sun and rain shield 3 is attached to the forward edge of the top 1 by adjustable clamping hinges 4. The body of the shield 3 is a rectangular board built up of thin sheets or laminations 5, 6, 7 and 8 in the usual way to make a board which can not warp or crack. Channel iron bindings 9 and 10 are applied to the side edges of the board to cover the ends of the grain of the wood, and the front lower edge 11 is filled, polished and finished to make it smooth and waterproof.

The details of one of the adjustable clamping hinges 4 are as follows:

An attaching plate 12 is rectangular in plan and adapted to be secured against the front face 13 of the automobile top 1 by screws 14. A bearing 15 extends forwardly from the plate 12 and has a horizontal screw threaded bore 16 and a corrugated flat vertical face 17 around the bore. The attaching plate 18 is secured to the upper front face of the board by screws 19. A bearing 20 extends upwardly and backwardly from the attaching plate 18 and has a horizontal opening to match the screw threaded opening 16 and a corrugated vertical flat face to match the face 17. A clamping screw 21 is inserted loosely through the bearing 20 and screwed into the bearing 16, and the screw is provided with a knurled head 22 for manipulating the screw.

When the hinges 4 have been applied, as shown in Fig. 4, the shield 3 will swing downwardly to make a shed over the space 23 between the top 1 and the upper edge of the wind shield 2, and the angle or position of the shield may be regulated by manipulating the screws 21, that is the screws are loosened and the shield moved to the desired position and then the screws are tightened to clamp the bearings 20 against the bearings 15.

When the use of the shield is not desired the screws 21 are loosened and the shield 3 is swung upwardly and backwardly on to the upper face of the top 1 as shown by the dotted lines in Fig. 2, and then the screws may be tightened to hold the parts from rattling.

Thus I have produced an adjustable sun and rain shield for automobiles, the leading features of which are a board of the desired size and adjustable clamping hinges for connecting the board to the automobile top, so that the board will swing downwardly for use and swing upwardly over the top when out of use.

Various changes may be made without departing from the spirit of my invention as claimed.

I claim:

1. An adjustable sun and rain shield for automobiles comprising a suitable board, pivot bearings fixed to the front edge of the automobile top and extending outwardly therefrom, and bearings fixed to the end of the board and extending upwardly therefrom adapted to be pivotally connected with the bearings on the front edge of the top, the pivot bearings of the board being of such form that the end of the board may swing under the edge of the top and may be swung over and lie upon the top.

2. An adjustable sun and rain shield for automobiles comprising a suitable board, and adjustable clamping hinges adapted for connecting the board to an automobile top, so that the board may be swung downwardly to bring its rear upper edge into engagement with the lower face of the top and form a close joint, and so that the board may be swung upwardly over the top out of use; said hinges comprising attaching plates adapted to be secured against the front face of an automobile top, bearings extending straight forwardly from the attaching plates in line with the center of the edge of the top and having horizontal screw-threaded bores and corrugated vertical faces around the bores, second attaching plates secured to the board, bearings extending upwardly and backwardly from the second attaching plates and having horizontal openings to match the screw-threaded bores and second corrugated faces to match the first corrugated faces, and the horizontal openings being far enough from the second attaching plates to allow the board to swing downwardly with its rear edge engaging the lower face of the top, and clamping screws inserted loosely through the openings into the screw-threaded bores so that the board will swing downwardly for use and upwardly over the automobile top out of use and may be clamped in an adjusted position.

In testimony whereof I have signed my name to this specification.

WILLIAM H. DAMON.